(12) United States Patent
Miura

(10) Patent No.: US 10,230,859 B2
(45) Date of Patent: Mar. 12, 2019

(54) MULTIFUNCTION DEVICE INCLUDING LOCK MECHANISM THAT SHIFTS BETWEEN STATES OF RESTRICTING AND ALLOWING PIVOTING BETWEEN ADJACENT UNIT AND SCANNER

(71) Applicant: Brother Kogyo Kabushiki Kaisha, Nagoya-shi, Aichi-ken (JP)

(72) Inventor: Katsuro Miura, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/336,873

(22) Filed: Oct. 28, 2016

(65) Prior Publication Data

US 2017/0126916 A1 May 4, 2017

(30) Foreign Application Priority Data

Oct. 30, 2015 (JP) .................................. 2015-214698

(51) Int. Cl.
| | |
|---|---|
| *H04N 1/00* | (2006.01) |
| *B41J 2/01* | (2006.01) |
| *B41J 2/435* | (2006.01) |
| *B41J 3/44* | (2006.01) |

(52) U.S. Cl.
CPC ............ *H04N 1/00814* (2013.01); *B41J 2/01* (2013.01); *B41J 2/435* (2013.01); *B41J 3/445* (2013.01); *H04N 1/0057* (2013.01); *H04N 1/00535* (2013.01); *H04N 1/00554* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2002/0061212 A1* | 5/2002 | Tanaka | G03G 15/605 399/379 |
| 2016/0065779 A1* | 3/2016 | Yamasaki | H04N 1/103 358/474 |

FOREIGN PATENT DOCUMENTS

JP  3644376 B2  4/2005

* cited by examiner

*Primary Examiner* — Lennin R Rodriguezgonzalez
(74) *Attorney, Agent, or Firm* — Banner & Witcoff, Ltd.

(57) ABSTRACT

A multifunction device includes a scanner and a printer disposed below the scanner. The scanner includes a support surface to support a document, and a scanning unit to scan the document. The scanning unit includes a sensor including reading elements arranged in a main scanning direction, and a moving member holding the sensor and configured to move in a sub-scanning direction. The scanner is connected to the printer pivotably between a first position at which the scanner conceals an upper portion of the printer, and a second position at which the scanner exposes the upper. In response to the moving member moving in the sub-scanning direction, a responsive mechanism shifts the lock mechanism between an operative state in which the lock mechanism restricts pivoting of the scanner relative to the printer, and an inoperative state in which the lock mechanism permits pivoting of the scanner relative to the printer.

13 Claims, 15 Drawing Sheets

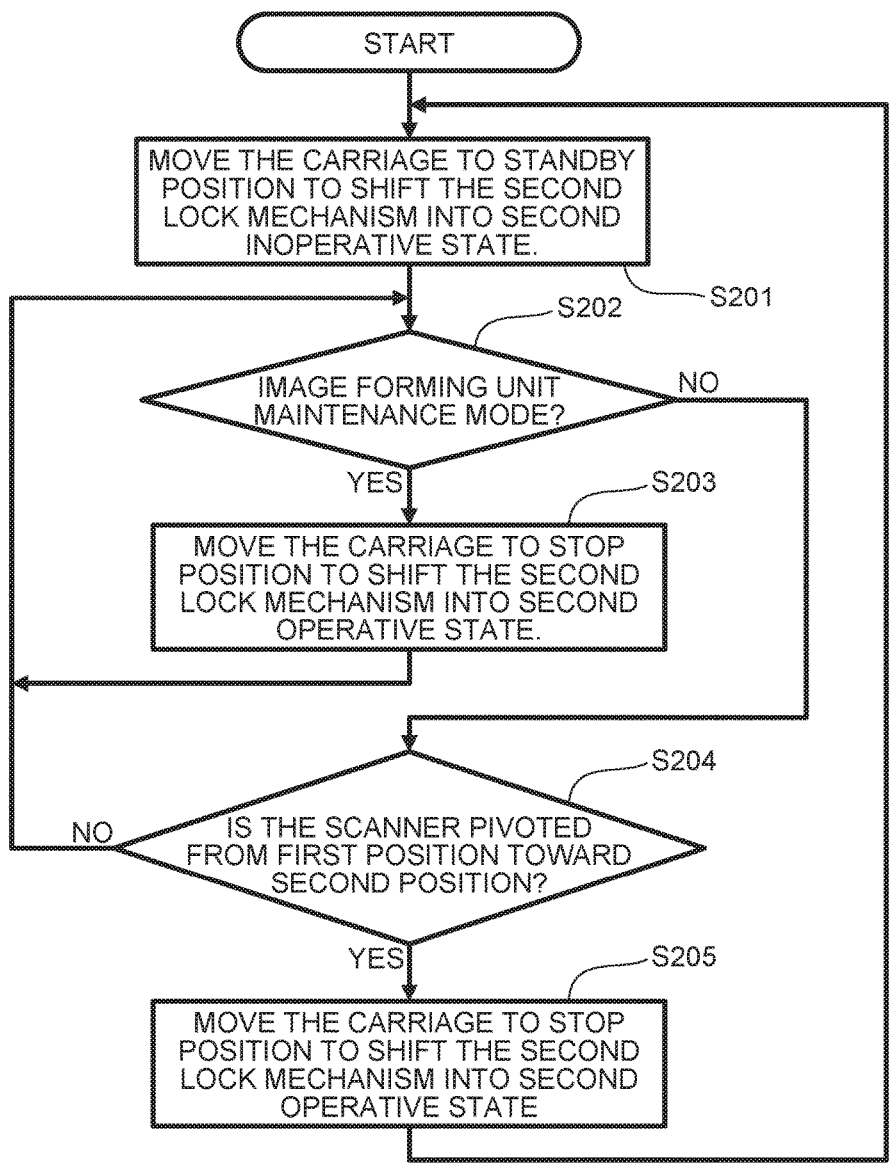

MULTIFUNCTION DEVICE INCLUDING LOCK MECHANISM THAT SHIFTS BETWEEN STATES OF RESTRICTING AND ALLOWING PIVOTING BETWEEN ADJACENT UNIT AND SCANNER

CROSS-REFERENCE TO RELATED APPLICATION

This application claims priority from Japanese Patent Application No. 2015-214698 filed on Oct. 30, 2015, the content of which is incorporated herein by reference in its entirety.

FIELD OF DISCLOSURE

Aspects disclosed herein relate to a multifunction device.

BACKGROUND

A known image forming apparatus, which is an example of a multifunction device, includes a reading unit, an image recording unit, and a platen cover. The image recording unit is disposed below the image reading unit. The platen cover is disposed above the reading unit.

The reading unit is connected to the image recording unit openably and closably relative to the image recording unit. The platen cover is connected to the reading unit openably and closably relative to the reading unit.

The image forming apparatus further includes a first lock unit, a second lock unit, and an operation handle. The first lock unit is activated to lock the platen cover in a closed position relative to the reading unit. The second lock unit which is activated to lock the reading unit in a closed position relative to the image recoding unit. The operation handle is operated to activate the first lock unit or the second lock unit via a lever and a link.

SUMMARY

It may be beneficial to provide a multifunction device configured to reduce unintended pivoting of a scanner or a cover unit, which may damage the multifunction device, in order to improve durability of the multifunction device without increasing the device size.

According to one or more aspects of the disclosure, a multifunction device comprises a scanner and a printer. The scanner includes a support surface configured to support a document, and a scanning unit configured to scan the document supported by the support surface. The scanning unit includes a sensor including a plurality of reading elements arranged in a main scanning direction, and a moving member holding the sensor and configured to move in a sub-scanning direction which is perpendicular to the main scanning direction. The printer is disposed below the scanner and includes an image forming unit configured to form an image on a sheet. The scanner is connected to the printer pivotably, about a first axis extending in a first direction, between a first position at which the scanner conceals an upper portion of the printer, and a second position at which the scanner exposes the upper portion of the printer. The multifunction device further comprises a lock mechanism and a responsive mechanism. The lock mechanism is configured to shift between an operative state in which the lock mechanism restricts pivoting of the scanner relative to the printer, and an inoperative state in which the lock mechanism permits pivoting of the scanner relative to the printer. The responsive mechanism is configured to shift the lock mechanism between the operative state and the inoperative state in response to the moving member moving in the sub-scanning direction.

According to one or more aspects of the disclosure, a multifunction device comprises a scanner, a printer, and a cover unit. The scanner includes a support surface configured to support a document, and a scanning unit configured to scan the document supported by the support surface. The scanning unit includes a sensor including a plurality of reading elements arranged in a main scanning direction, and a moving member holding the sensor and configured to move in a sub-scanning direction which is perpendicular to the main scanning direction. The printer is disposed below the scanner and includes an image forming unit configured to form an image on a sheet. The cover unit is disposed above the scanner. The scanner is connected to the printer pivotably, about a first axis extending in a first direction, between a first position at which the scanner conceals an upper portion of the printer, and a second position at which the scanner exposes the upper portion of the printer. The cover unit is connected to the scanner pivotably, about a second axis extending in the first direction, between a third position at which the cover unit conceals the support surface of the scanner, and a fourth position at which the cover unit exposes the support surface of the scanner. The multifunction device further comprises a lock mechanism and a responsive mechanism. The lock mechanism is configured to shift between an operative state in which the lock mechanism restricts pivoting of the cover unit relative to the scanner, and an inoperative state in which the lock mechanism permits pivoting of the cover unit relative to the scanner. The responsive mechanism is configured to shift the lock mechanism between the operative state and the inoperative state in response to the moving member moving in the sub-scanning direction.

BRIEF DESCRIPTION OF THE DRAWINGS

Aspects of the disclosure are illustrated by way of example and not by limitation in the accompanying figures in which like reference characters indicate similar elements.

FIG. 15 is a flowchart showing a program for controlling the second lock mechanism and a second responsive mechanism in the second embodiment according to one or more aspects of the disclosure.

DETAILED DESCRIPTION

An illustrative embodiment of the disclosure will be described with reference to the accompanying drawings.

First Illustrative Embodiment

Figure 1:
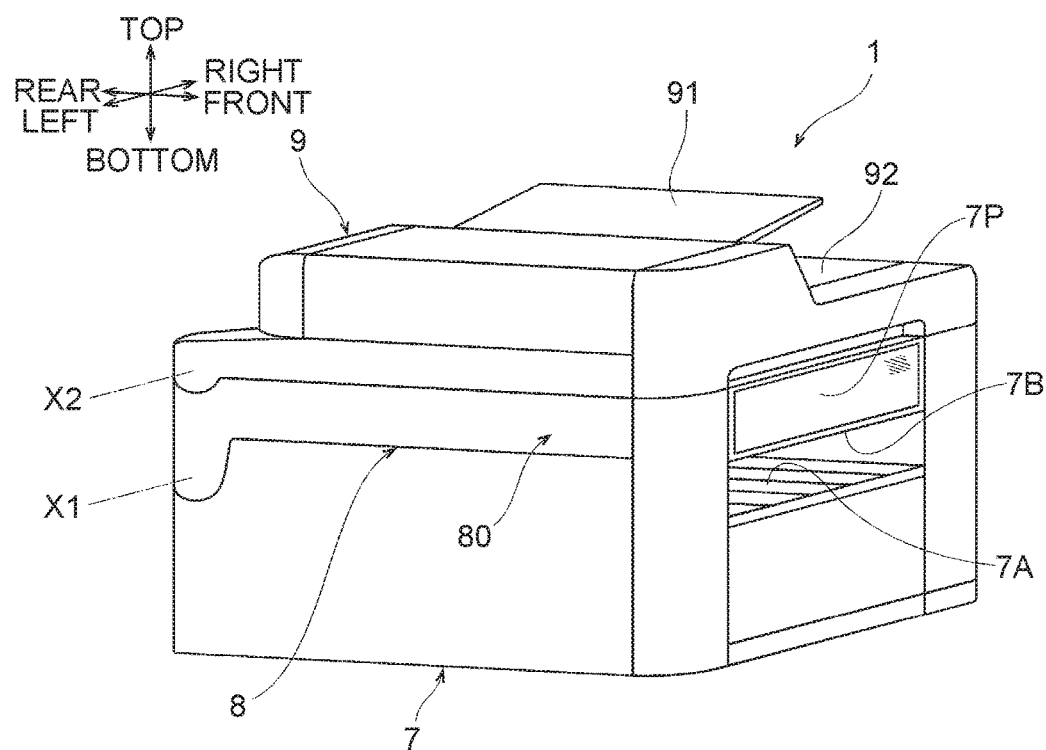
FIG. 1 is a perspective view of a multifunction device in a first illustrative embodiment according to one or more aspects of the disclosure.

As shown in FIG. 1, a multifunction device 1 according to the first illustrative embodiment is an example of a multifunction device. As shown in FIG. 1, a top-bottom direction may be defined with reference to an orientation of the multifunction device 1 that may be disposed in an orientation in which it may be intended to be used. A side of the multifunction device 1, in which an operation panel 7P may be provided, may be defined as the front of the multifunction device 1. The right and left of the multifunction device 1 may be defined as viewed from the front of the multifunction device 1. A front-rear direction and a right-left direction may be defined with reference to the front of the multifunction device 1. The directions defined in FIG. 1 are applicable to all the drawings. Hereinafter, configuration of the multifunction device 1 will be described with reference to appropriate drawings.

<Overall Configuration>

Figure 2:
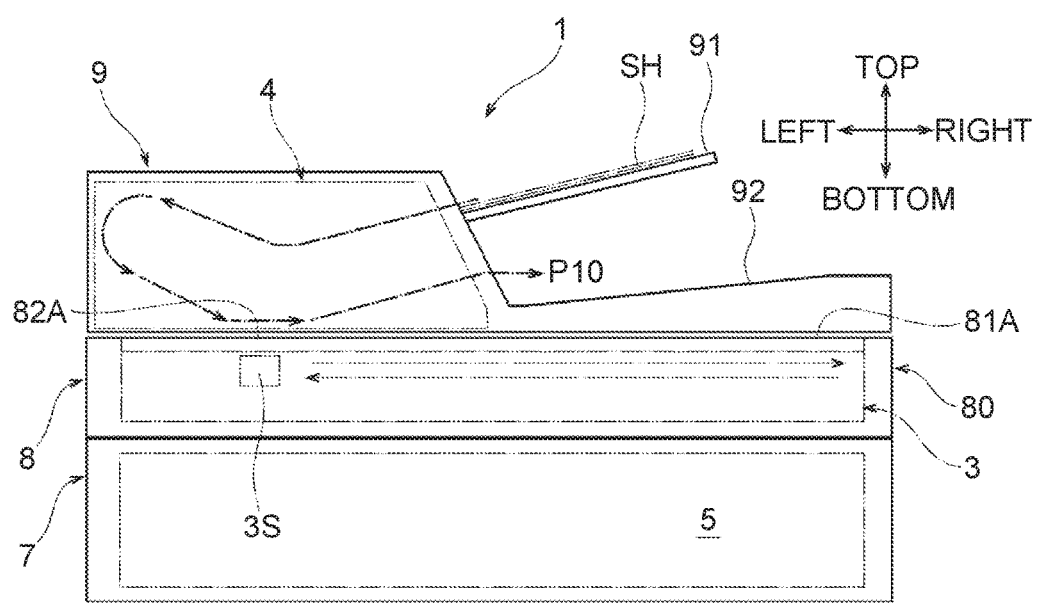
FIG. 2 is a schematic front view of the multifunction device in the first illustrative embodiment according to one or more aspects of the disclosure.

As shown in FIGS. 1 to 7, the multifunction device 1 includes a scanner 8, a printer 7, and a cover unit 9. As shown in FIGS. 1 and 2, the printer 7 and the scanner 8 each have a substantially box shape with a relatively short height. The printer 7 is disposed below the scanner 8. The cover unit 9 is disposed above the scanner 8. That is, the printer 7, the scanner 8, and the cover unit 9 are disposed one above another in the top-bottom direction.

As shown in FIGS. 1, and 4 to 6, the scanner 8 is connected to the printer 7 so as to be pivotable about a first axis X1 extending in the right-left direction. The cover unit 9 is connected to the scanner 8 so as to be pivotable about a second axis X2 extending in the right-left direction. The right-left direction in which the first and second axes extend is an example of a "first direction"

Figure 5:
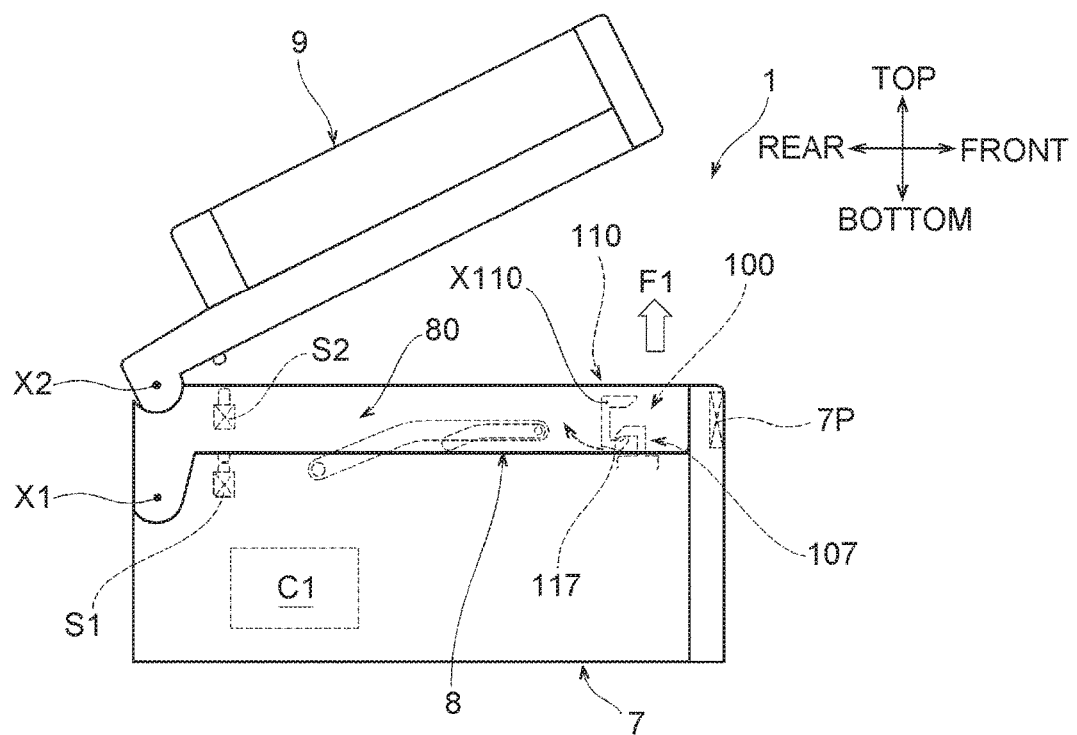
FIG. 5 is a side view of the scanner at the first position and the cover unit pivoted to the fourth position in the first illustrative embodiment according to one or more aspects of the disclosure.
Figure 6:
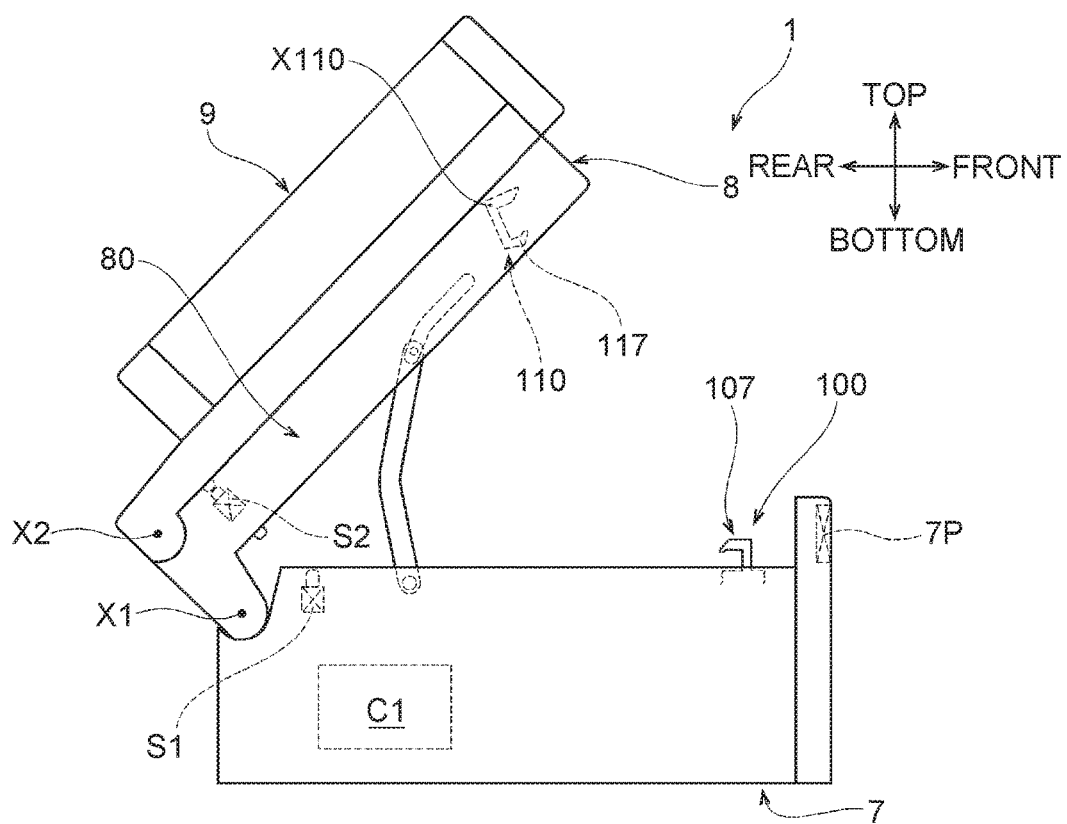
FIG. 6 is a side view of the scanner pivoted to a second position and the cover unit at a third position in the first illustrative embodiment according to one or more aspects of the disclosure.

The scanner 8 is configured to pivot between a first position (e.g., the position of the scanner 8 shown in FIGS. 1 to 5) and a second position (e.g., the position of the scanner 8 shown in FIG. 6). As shown in FIGS. 1 to 5, the scanner 8 at the first position conceals an upper portion of the printer 7. As shown in FIG. 6, the scanner 8 at the second position exposes the upper portion of the printer 7. As shown in FIG. 2, the scanner 8 includes a scanning unit 3 accommodated therein.

Figure 3:
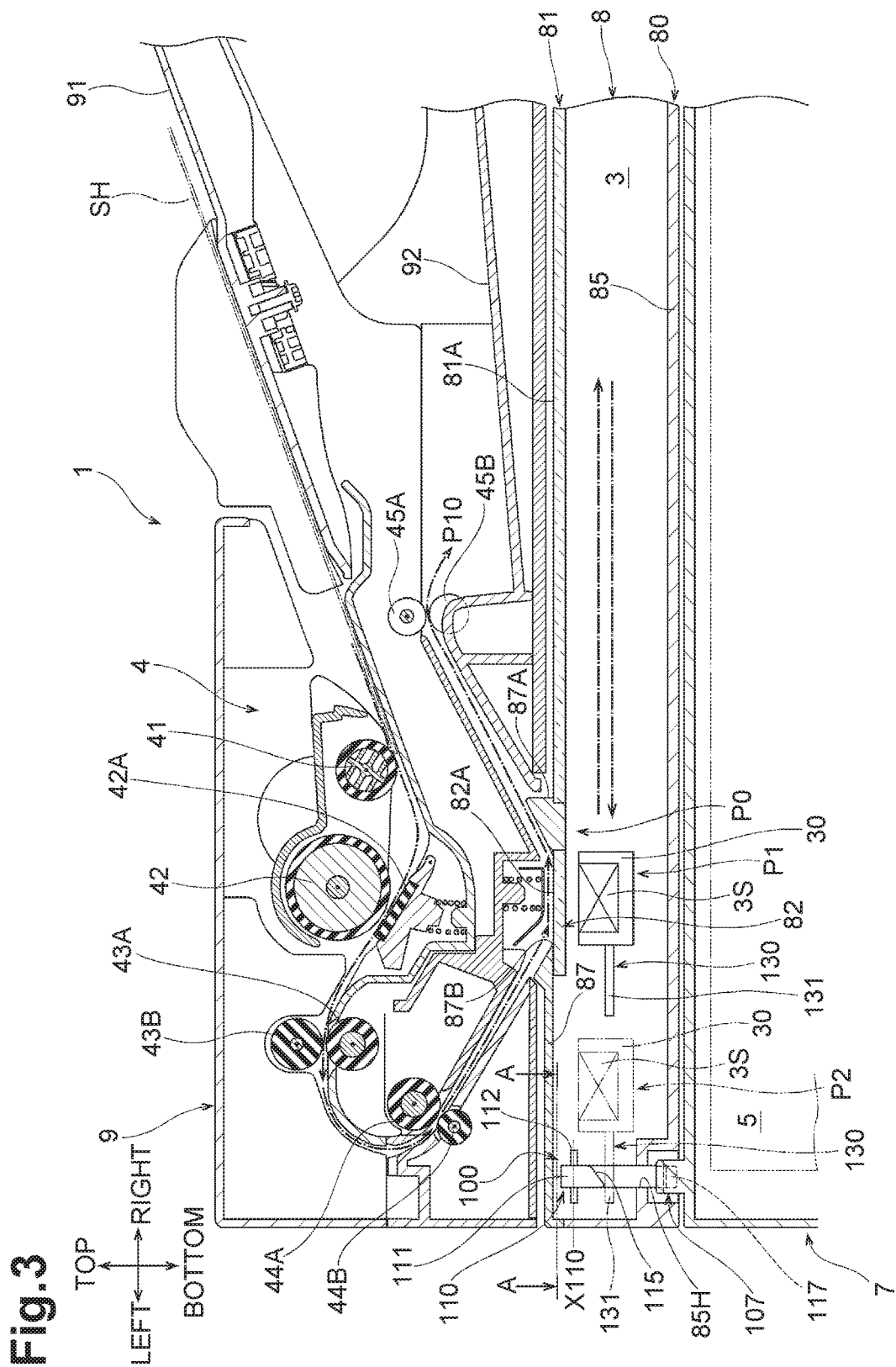
FIG. 3 is a schematic partial sectional view of the multifunction device in the first illustrative embodiment according to one or more aspects of the disclosure.
Figure 4:
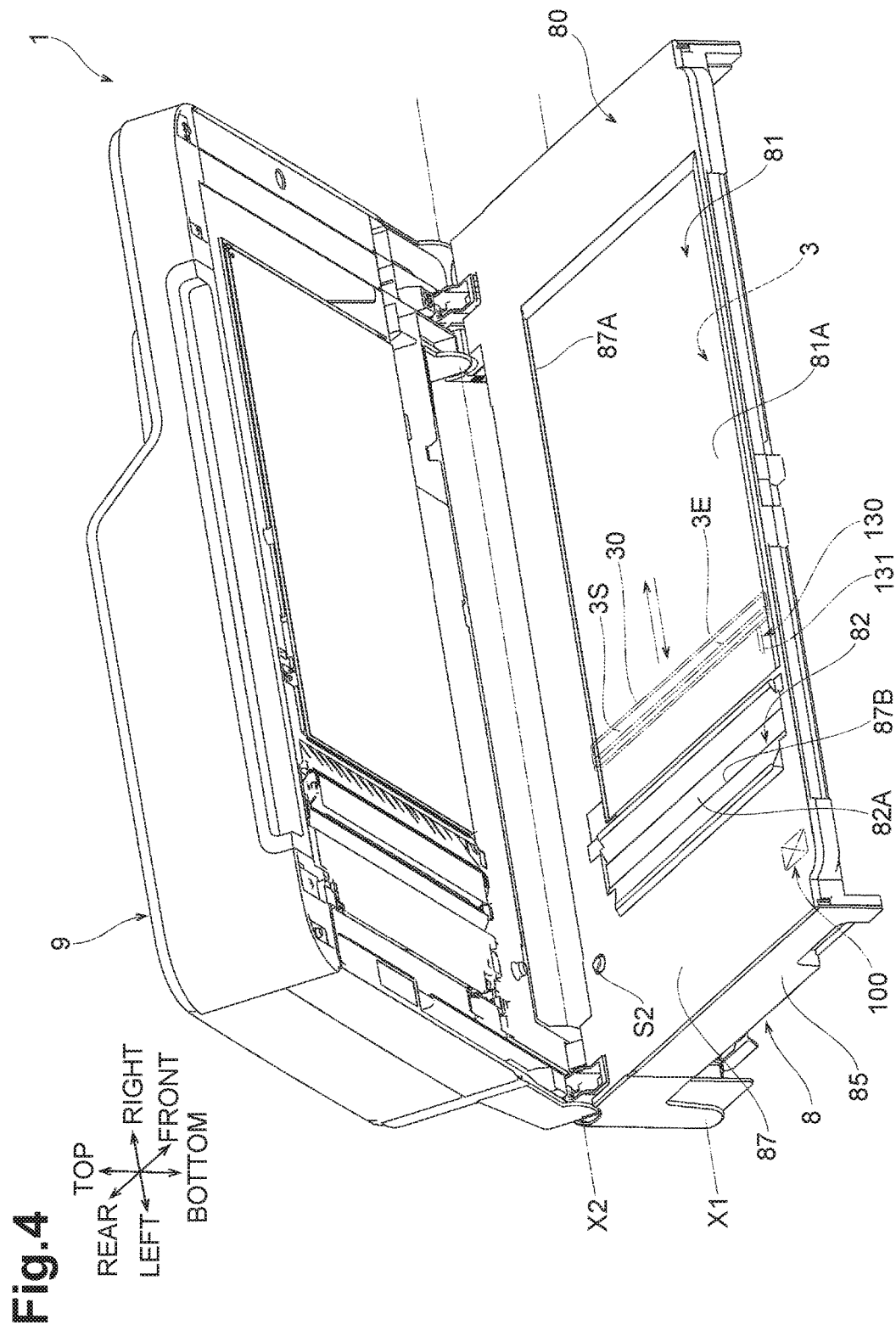
FIG. 4 is a partial perspective view of a scanner at a first position and a cover unit pivoted to a fourth position in the first illustrative embodiment according to one or more aspects of the disclosure.

The cover unit 9 is configured to pivot between a third position (e.g., the position of the cover unit 9 shown in FIGS. 1 to 3, and 6) and a fourth position (e.g., the position of the cover unit 9 shown in FIGS. 4 and 5). As shown in FIGS. 1 to 3, and 6, the cover unit 9 at the third position conceals a support surface 81A. As shown in FIGS. 4 and 5, the cover unit 9 at the fourth position exposes the support surface 81A. Therefore, a user is allowed to place a document to be read onto the support surface 81A. As shown in FIGS. 2 and 3, the cover unit 9 includes a conveyor unit 4.

The printer 7 includes an image forming unit 5 accommodated therein. The image forming unit 5 is configured to form an image onto a recording sheet using an inkjet printing method or a laser printing method. As shown in FIG. 1, the printer 7 has an upper surface serving as a sheet discharge portion 7A. One or more recording sheets onto which respective images have been formed by the image forming unit 5 are discharged onto the sheet discharge portion 7A. The sheet discharge portion 7A and a lower surface of the scanner 8 define a cavity therebetween. The cavity serves as a sheet removal opening 7B from which a user is allowed to remove the recording sheets discharged onto the discharge portion 7A. The operation panel 7P is disposed at the front of the printer 7 and above the sheet removal opening 7B. When the scanner 8 is located at the second position (refer to FIG. 6), a maintenance area (not shown) is exposed. The maintenance area may be an opening defined in the upper surface of the printer 7 and positioned behind the sheet discharge portion 7A. Through the opening, maintenance of the image forming unit 5 may be implemented.

Figure 7:
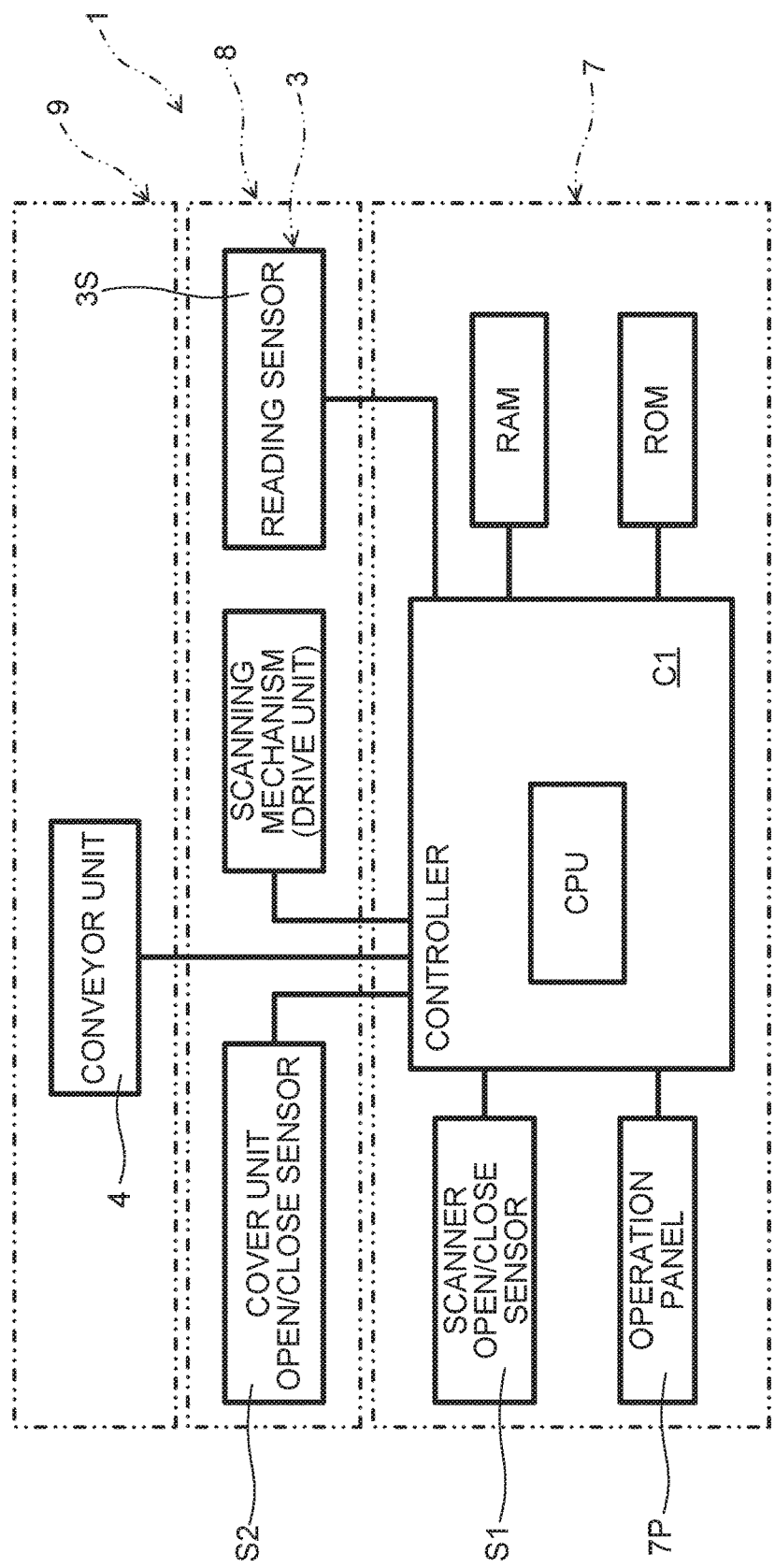
FIG. 7 is a block diagram of the multifunction device in the first illustrative embodiment according to one or more aspects of the disclosure.

As shown in FIGS. 5 to 7, the multifunction device 1 includes a controller C1, the operation panel 7P, a scanner open/close sensor S1, and a cover unit open/close sensor S2. The operation panel 7P, the scanner open/close sensor S1, and the cover unit open/close sensor S2 are an example of a "detection unit". The printer 7 includes the controller C1, the operation panel 7P, and the scanner open/close sensor S1. The scanner 8 includes the cover unit open/close sensor S2. In the first illustrative embodiment, as shown in FIGS. 5 and 6, the scanner open/close sensor S1 and the cover unit open/close sensor S2 are disposed closer to the first axis X1, i.e., closer to an rear end of the multifunction device 1. However, these sensors S1, S2 may be disposed at other positions.

As shown in FIG. 7, the controller C1 is a control circuit including a CPU and controls the image forming unit 5, the scanning unit 3, the conveyor unit 4, and the operation panel 7P using various information stored in information storage such as a ROM (read only memory) and a RAM (random access memory). Detection signals from the scanner open/close sensor S1 and the cover unit open/close sensor S2 are transmitted to the controller C1.

The operation panel 7P displays various information on operating the multifunction device 1. The operation panel 7P allows a user to input instructions therethrough. For example, in the first illustrative embodiment, the user is allowed to select, through the operation panel 7P, between the "scan mode" to activate the scanning unit 3 and the "print mode" to activate the image forming unit 5. When the user makes an input, through the operation panel 7P, to select the "scan mode", a signal indicating that the scanner is to be activated is transmitted from the operation panel 7P to the controller C1. The operation panel 7P displays various settings, including a setting of the "scan mode" or the "print mode", and various operation states. The user is allowed to make an input, through the operation panel 7P, in response to the displayed information.

As shown in FIGS. 5 and 6, the scanner open/close sensor S1 detects pivoting of the scanner 8 from the first position toward the second position. Specifically, the scanner open/close sensor S1 detects pivoting of the scanner 8 from the first position toward the second position, for example, by a very small angle of one degree to several degrees, and transmits a detection signal to the controller C1.

As shown in FIGS. 4 to 6, the cover unit open/close sensor S2 detects pivoting of the cover unit 9 from the third position toward the fourth position. Specifically, the cover unit open/close sensor S2 detects pivoting of the cover unit 9 from the third position toward the fourth position, for example, by a very small angle of one degree to several degrees, and transmits a detection signal to the controller C1.

As shown in FIGS. 1 to 6, the scanner 8 includes a scanner housing 80. As shown in FIGS. 3 and 4, the scanner housing 80 includes a scanner base 85. The scanner base 85 has a shallow box shape having a bottom and front, rear, right, and left walls. The scanner base 85 has an open upper end. The scanner housing 80 further includes a scanner frame 87 that covers an upper portion of the scanner base 85. The scanner frame 87 has openings (to be described later) in its central portion. The scanner housing 80 is an assembly of the scanner base 85 and the scanner frame 87. The scanner base 85 and the scanner frame 87 are assembled while a first platen glass 81 and a second platen glass 82 are interposed therebetween (refer to FIGS. 3 and 4). The platen glass 81 and the second platen glass 82 are exposed through the openings of the scanner frame 87 and define a portion of an upper surface of the scanner 8.

The scanner frame 87 has a first opening 87A and a second opening 87B. The first opening 87A may have a rectangular shape extending along both the front-rear direction and the right-left direction. The first opening 87A has a relatively large area. The second opening 87B is positioned to the left of the first opening 87A. The second opening 87B may be a narrow rectangular shape. The second opening 87B has longer sides extending along the front-rear direction and shorter sides extending along the right-left direction.

The support surface 81A is defined by a portion of an upper surface of the first platen glass 81 exposed through the first opening 87A. A reading surface 82A is defined by a portion of an upper surface of the second platen glass 82 exposed through the second opening 87B.

As shown in FIGS. 2 to 4, and 8, the scanner 8 further includes a scanning unit 3 inside the scanner housing 80. The scanning unit 3 includes a reading sensor 3S, a carriage 30, and a scanning mechanism (not shown). The reading sensor 3S, the carriage 30, and the scanning mechanism are located in a space defined by the front, rear, right, and left walls inside the scanner housing 80. The reading sensor 3S is an example of a "sensor" portion". The carriage 30 is an example of a "moving member".

Figure 8:
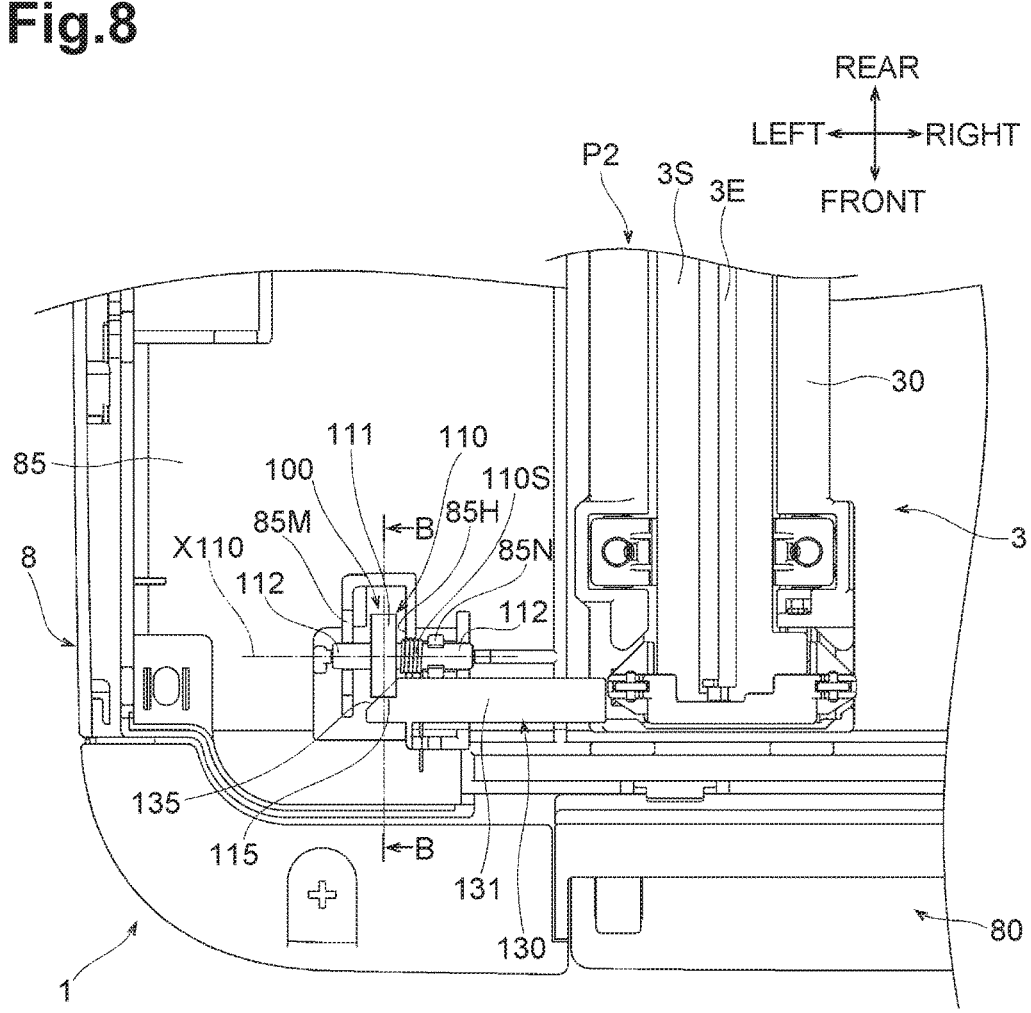
FIG. 8 is a partial sectional view taken along line A-A of FIG. 3 in the first illustrative embodiment according to one or more aspects of the disclosure.

As shown in FIGS. 4 and 8, scanning elements 3E are arrayed on an upper surface of the reading sensor 3S. In the first illustrative embodiment, a main scanning direction corresponds to the front-rear direction. The reading sensor 3S may be a well-known image reading sensor, for example, a contact image sensor ("CIS") or a charge-coupled device ("CCD").

The carriage 30 holds the reading sensor 3S. The scanning mechanism (not shown) may include a motor, a pulley, and a timing belt, as is well known. When the motor of the scanning mechanism is controlled by the controller C1 to rotate, the rotational drive force is transmitted, via the pulley and the timing belt, to the carriage 30. As shown in FIGS. 3 and 4, the carriage 30 is controlled by the controller C1 to reciprocate along the sub-scanning direction under the support surface 81A and the reading surface 82A while holding the reading sensor 3S. In the first illustrative embodiment, the sub-scanning direction corresponds to the right-left direction.

As shown by a solid line in FIG. 3, when the carriage 30 is stopped at a stationary position P1, the reading sensor 3S is positioned under the reading surface 82A. As shown by a two-dot line in FIG. 3, when the carriage 30 is stopped at a particular stop position P2, the reading sensor 3S is positioned at a left end of the scanner housing 8. The carriage 30 shown in FIG. 8 is stopped at the particular stop position P2. As shown by an arrow in FIG. 3, when the carriage 30 is stopped at a standby position P0, the reading sensor 3S is positioned between the support surface 81A and the reading surface 82A.

When the reading sensor 3S reads an image of a stationary document, the support surface 81A supports the document from below. The document to be read may be, for example, paper, an overhead projector sheet, or a book. When the reading sensor 3S, which is held by the carriage 30 stopped at the stationary position P1, reads an image on each of documents sheets SH being conveyed one by one by the conveyor unit 4, the reading surface 82A guides each of the document sheets SH from below.

As shown in FIGS. 2 and 3, the cover unit 9 includes the conveyor unit 4. The conveyor unit 4 includes a document feed tray 91 and a document discharge tray 91. The document feed tray 91 and the document discharge tray 92 are disposed at a right portion of the cover unit 9. The document discharge tray 92 is located below the document feed tray 91.

As shown in FIG. 3, the conveyor unit 4 includes a feed roller 41, separation roller 42, a separation pad 42A, a first conveyor roller pair 43A, 43B, a second conveyor roller pair 44A, 44B, and a discharge roller pair 45A, 45B.

The document feed tray 91 supports one or more document sheets SH which are subjected to image reading and conveyed by the conveyor unit 4. The feed roller 41, the separation roller 42, and the separation pad 42A separate a document sheet SH from other document sheets SH supported by the document feed tray 91 and feed the separated document sheet SH downstream in a conveyance path P10. The first conveyor roller pair 43A, 43B conveys the separated document sheet SH along the conveyance path P10 such that the document sheet SH passes over the reading sensor 3S positioned at the stationary position P1. The discharge roller pair 45A, 45B discharges the document sheet SH having passed over the reading sensor 3S onto the document discharge tray 92.

<Image Reading Operation>

A first lock mechanism 100 and a first responsive mechanism 130 are shifted, as will be described later, depending on the operation modes and states of use of the multifunction device 1. When image reading is not executed, the controller C1 controls the scanning mechanism (not shown) to position the carriage 30, as shown in FIG. 3, at the standby position P0 or the particular stop position P2.

When the reading sensor 3S reads an image on a document supported on the support surface 81A, the controller C1 controls the scanning mechanism (not shown) to move the carriage 30 along the right-left direction from the scanning start position, which is below the left end of the support surface 81A, to the scanning end position, which is below the right end of the support surface 81A. In this way, the reading sensor 3S held by the carriage 30 reads the image on the document supported on the support surface 81A.

When the reading sensor 3S reads images on document sheets SH supported on the document feed tray 91, the controller C1 controls the scanning mechanism (not shown) to stop the carriage 30 at the stationary position P1 and controls the conveyor unit 4 to convey document sheets SH from the document feed tray 91 along the conveyance path P10. The reading sensor 3S reads an image on each document sheet SH which passes over the reading sensor 3S located at the stationary position P1 while contacting the reading surface 82A. The conveyor unit 4 conveys and discharges onto the discharge tray 92 each document sheet SH having undergone image reading.

<First Lock Mechanism and First Responsive Mechanism>

As shown in FIGS. 3 to 6 and 8 to 10, the multifunction device 1 further includes the first lock mechanism 100 and the first responsive mechanism 130 in order to restrict pivoting of the scanner 8 relative to the printer 7, depending on the states of use of the multifunction device 1. As shown in FIGS. 4 to 6 and 8, the first lock mechanism 100 and the first responsive mechanism 130 are disposed at an end portion of the multifunction device 1 away from the first axis X1 in the main scanning direction, i.e., at front end portions of the scanner 8 and the printer 7. In the first illustrative embodiment, the first lock mechanism 100 and the first responsive mechanism 130 are disposed at left end portions of the scanner 8 and the printer 7. The first lock mechanism 100 is an example of "lock mechanism", and the first responsive mechanism 130 is an example of a "responsive mechanism is an example of a "responsive mechanism".

The first lock mechanism 100 includes an engaged portion 107 which is shown in FIGS. 3, 5, and 6, and a lever 110 which is shown in FIGS. 3, 5, 6, and 8 to 10.

As shown in FIGS. 3, 5, and 6, the engaged portion 107 is disposed at a front end portion of the printer 7 and at a position adjacent to a left side surface of the printer 7. The engaged portion 107, which is a substantially hook-shaped protrusion, protrudes upward from an upper surface of the printer 7 and is bent rearward.

Figure 9:
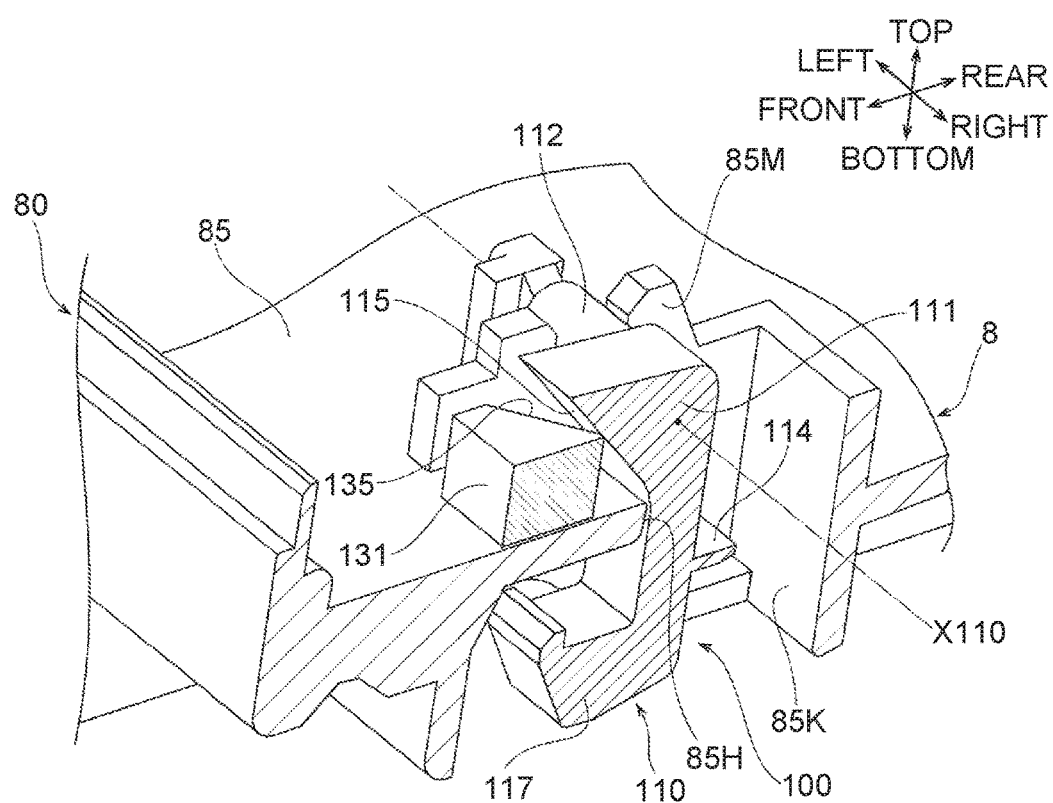
FIG. 9 is a partial perspective sectional view taken along line B-B of FIG. 8 in the first illustrative embodiment according to one or more aspects of the disclosure.
Figure 10:
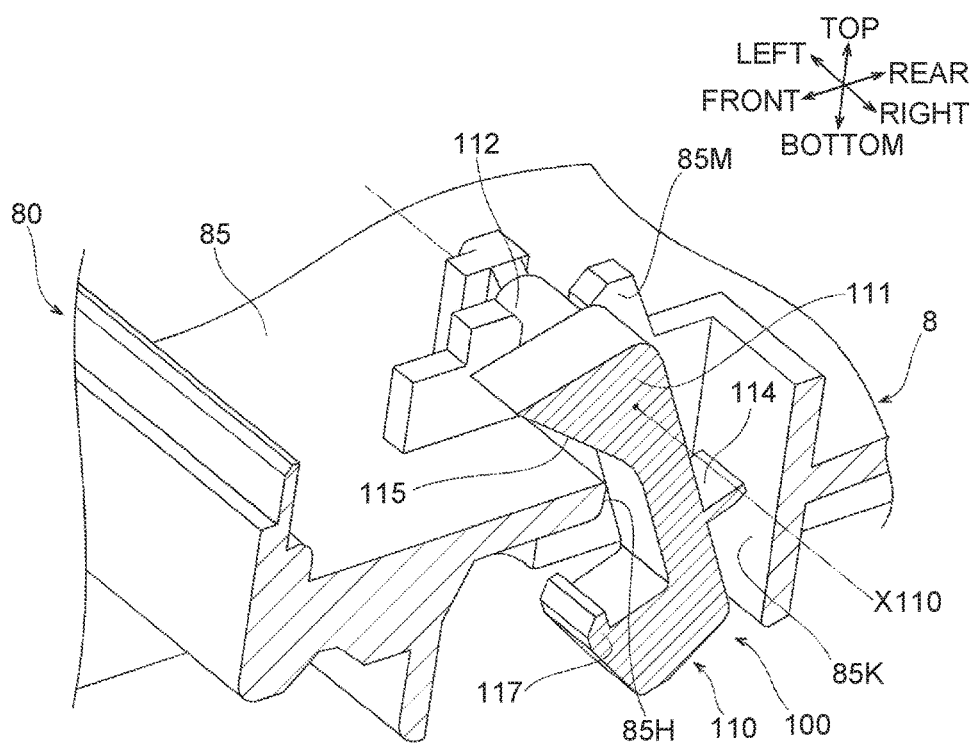
FIG. 10 is a partial perspective sectional view taken similarly to FIG. 9.

As shown in FIGS. 3, 5, 6, and 8, the lever 110 is disposed at a front end portion of the scanner 8 and at a position adjacent to a left side surface of the scanner 8. As shown in FIGS. 8 to 10, two lever supports 85M, 85N are disposed protruding upward from a bottom wall of the scanner base 85. The lever supports 85M, 85N are arranged at an interval in the right-left direction. The lever supports 85m, 85N define therebetween an opening 85H which penetrates the bottom wall of the scanner base 85 in the top-bottom direction. The lever 110 is fitted in the opening 85H. The lever supports 85M, 85N define a pivot axis X110 of the lever 110, as will be described later. In the first illustrative embodiment, the first direction and the pivot axis X110 extend substantially parallel to the sub-scanning direction which is the right-left direction.

The lever 110 includes a base 111, shafts 112, a stopper 114, an engaging portion 117, and a contact surface 115.

The base 111, when at a position shown in FIG. 9, extends like a column in the top-bottom direction. An upper end of the base 111 is positioned above the opening 85H, a middle portion of the base 111 passes through the opening 85H, and a lower end of the base 111 is positioned below the opening 85H and extends toward the printer 7.

The shafts 112 are cylindrical. One of the shafts 112 extends rightward from an upper end of the base 111 while the other extends leftward. The right and left shafts 112 are supported respectively by the lever supports 85N and 85M such that the lever 110 is pivotable about the pivot axis X110. As shown in FIG. 8, a torsion coil spring 110S is disposed between the right shaft 112 and the bottom wall of the scanner base 85. The lever 110 is urged by the torsion coil spring 110S such that a lower end thereof moves rearward, i.e., from a position shown in FIG. 9 toward a position shown in FIG. 10.

As shown in FIGS. 9 and 10, the stopper 114 extends rearward from a rear surface of the middle portion of the base 111. As shown in FIG. 10, when the lower end of the base 111 is urged to move rearward, the stopper 114 contacts and is stopped by an inner wall 85K, which defines, from rear, the opening 85H, thereby restricting a pivoting range of the lever 110.

As shown in FIGS. 9 and 10, the engaging portion 117 is bent frontward from a lower end of the base 111 to extend frontward, and extends further upward. Although the engaged portion 107 of the printer 7 is omitted from FIGS. 9 and 10, relative relationship between the engaging portion 117 and the engaged portion 107 is the same as those shown in FIGS. 3, 5, and 6. The engaging portion 117 of the lever 110 engages the engaged portion 107 when the lever 110 pivots from the position shown in FIG. 10 to the position shown in FIG. 9. At least one of the engaging portion 117 and the engaged portion 107 is chamfered such that they engage each other without interference from each other when the lever 110 is pivoting.

As shown in FIG. 9, when the lower end of the base 111 moves forward against an urging force of the torsion coil spring 110S, the lever 110 pivots to such a position that the engaging portion 117 engages the engaged portion 107. FIG. 5 illustrates the lever 110 at a pivoted position where the engaging portion 117 is engaged with the engaged portion 107. The lever 110 thereby restricts pivoting of the scanner 8 relative to the printer 7. When the lever 110 is in a state shown in FIGS. 5, 8, and 9, the first lock mechanism 100 is in a first operative state and restrict the scanner 8 from moving up relative to the printer 7.

In contrast, as shown in FIG. 10, when the lower end of the base 111 is urged by the torsion coil spring 110S to move rearward, the lever 110 pivots to such a position that the engaging portion 117 is released from the engaged portion 107. FIG. 6 illustrates the lever 110 at a pivoted back position where the engaging portion 117 is released from the engaged portion 107. When the lever 110 is in a state shown in FIGS. 6 and 10, the first lock mechanism 100 is in a first inoperative state and permits the scanner 8 to move up relative to the printer 7.

As shown in FIGS. 8 to 10, the contact surface 115 is located at a front surface of an upper end of the base 111. The contact surface 115 is away from the pivot axis X110 in a radially outward direction, i.e., toward the front and extends obliquely in an up-front direction. This oblique contact surface 115 extends in a range which is above the opening 85H through which the base 111 penetrates.

As shown in FIGS. 3, 4, 8, and 9, the first responsive mechanism 130 includes a protrusion 131 which protrudes from a left side surface of the carriage 30 in a direction substantially parallel to the sub-scanning direction, i.e., in a leftward direction. As shown in FIGS. 8 and 9, the protrusion 131 is shaped like a prism and has an inclined surface 135 at a tip thereof. The inclined surface 35 is inclined in a front-left direction so as to intersect the pivot axis X110. In other words, the inclined surface 135 is inclined such that a portion thereof closer to the tip of the protrusion 131 is farther from the lever 110.

As shown in FIGS. 3 and 8, when the carriage 30 moves to the particular stop position P2, the inclined surface 135 of the protrusion 131 contacts the contact surface 115 and causes the lever 110 to pivot about the pivot axis X110. Consequently, the lever 110 pivots to such a position that the engaging portion 117 engages the engaged portion 107. As shown in FIGS. 5, 8, and 9, the first lock mechanism 100 is brought into the first operative state.

In contrast, as shown in FIGS. 3 and 8, when the carriage 30 moves rightward away from the particular stop position P2, the inclined surface 135 retracts rightward away from the contact surface 115. The torsion coil spring 110S urges the lever 110 to pivot about the pivot axis X110 in a reverse direction, i.e., counterclockwise. Consequently, the lever 110 pivots to such a position that the engaging portion 117 is released from the engaged portion 107. As shown in FIGS. 6 and 10, the first lock mechanism 100 is brought into the first inoperative state.

The controller C1 controls the first lock mechanism 100 and the first responsive mechanism 130, which are configured as described above, using a control program shown in FIG. 11. When a power switch of the multifunction device 1 is turned on to activate the multifunction device 1, the controller C1 starts the control program shown in FIG. 11.

First, in step S101, the controller C1 controls the carriage 30 to move to the standby position P0 shown in FIG. 3. The inclined surface 135 of the protrusion 131 is brought out of contact with the contact surface 115, and the lever 110 pivots to such a position that the engaging portion 117 is released from the engaged portion 107. Consequently, the first lock mechanism 100 shifts into the first inoperative state shown in FIGS. 6 and 10.

Subsequently, in step S102, the controller C1 determines, by referring to an input signal from the operation panel 7P, whether a "scan mode" is selected. If the controller determines as "Yes" in the step S102, the program goes to step S103. On the other hand, if the controller C1 determines as "No" in step S102, the program goes to step S105. It may be possible in the multifunction device 1 to select between a plurality of modes, such as a "print mode" and a "copy mode" in addition to a "scan mode". However, the control program shown in FIG. 11 will be described while focusing on processing in a "scan mode".

After the controller C1 determines, in step S102, that the "scan mode" is selected, the controller C1 controls, in step S103, the carriage 30 to move to the particular stop position P2 shown in FIGS. 3 and 8. This causes the inclined surface 135 of the protrusion 131 to contact the contact surface 115, and the lever 110 pivots to such a position that the engaging portion 117 engages the engaged portion 107. Consequently, the first lock mechanism shifts into the first operative state shown in FIGS. 5, 8, and 9. When the "scan mode" is selected in the multifunction device 1, there is little chance that maintenance will be performed for the image forming unit 5 in the printer 7 and that the scanner 8 will be pivoted from the first position to the second position. In contrast, there is a high chance in the "scan mode" that the cover unit 9 will be pivoted from the third position to the fourth position in order to place a document to be read on the support surface 81A. In this case, the scanner 8 may pivot unintendedly as the cover unit 9 is pivoted violently. The first lock mechanism 100, which shifts, in step S103, into the first operative state shown in FIGS. 5, 8, and 9, may prevent or reduce unintended pivoting of the scanner 8 in the "scan mode".

Subsequently, the program goes from step S103 to step S104. In response to a command, input through the operation panel 7P, to execute image reading, the controller C1 executes image reading as commanded while controlling movement of the carriage 30. Specifically, in order to read a document supported on the support surface 81A of the first platen glass 81, the controller C1 executes image reading by controlling the carriage 30 to reciprocate in the right-left direction between the scanning start position below the left end of the support surface 81A and the scanning end position below the right end of the support surface 81A. In contrast, in order to read document sheets SH conveyed by the conveyor unit 4, the controller C1 controls the carriage 30 to move to the stationary position P1 and executes image reading. When the carriage 30 moves as described above, the inclined surface 135 of the protrusion 131 is brought out of contact with the contact surface 115, and the lever 110 pivots to such a position that the engaging portion 117 is released from the engaged portion 107. Consequently, the first lock mechanism 100 shifts into the first inoperative state shown in FIGS. 6 and 10. After image reading is completed, the program returns to step S101. There is little chance during execution of image reading that a user will pivot the cover unit 9 or the scanner 8. Therefore, during execution of image reading, there may be no problem with the first lock mechanism set in the first inoperative state.

If the program moves from step S102 to step S105, the controller C1 refers to a detection signal from the cover unit open/close sensor S2 and determines whether the cover unit 9 is pivoted from the third position toward the fourth position. If the controller C1 determines "Yes" in step S105, the program goes to step S106. On the other hand, if the controller C1 determines "No" in step S105, the program goes to step S102.

If the program goes from step S105 to step S106, the controller C1 controls the carriage 30 to move to the particular stop position P2 shown in FIGS. 3 and 8. This causes the protrusion 131 to actuate the lever 110, and the first lock mechanism 100 shifts into the first operative state shown in FIGS. 5, 8, and 9. For example, there may be a user who opens the cover unit 9 to place a document on the support surface 81A before selecting the "scan mode" through the operation panel 7P. In this case, in response to the cover unit open/close sensor S2 detecting pivoting of the cover unit 9, the controller C1 shifts, in step S106, the first lock mechanism 100 into the first operative state. This may prevent or reduce unintended pivoting of the scanner 8 even when the cover unit 9 is pivoted violently from the third position toward the fourth position. After step S106, the program returns to step S102.

Figure 11:
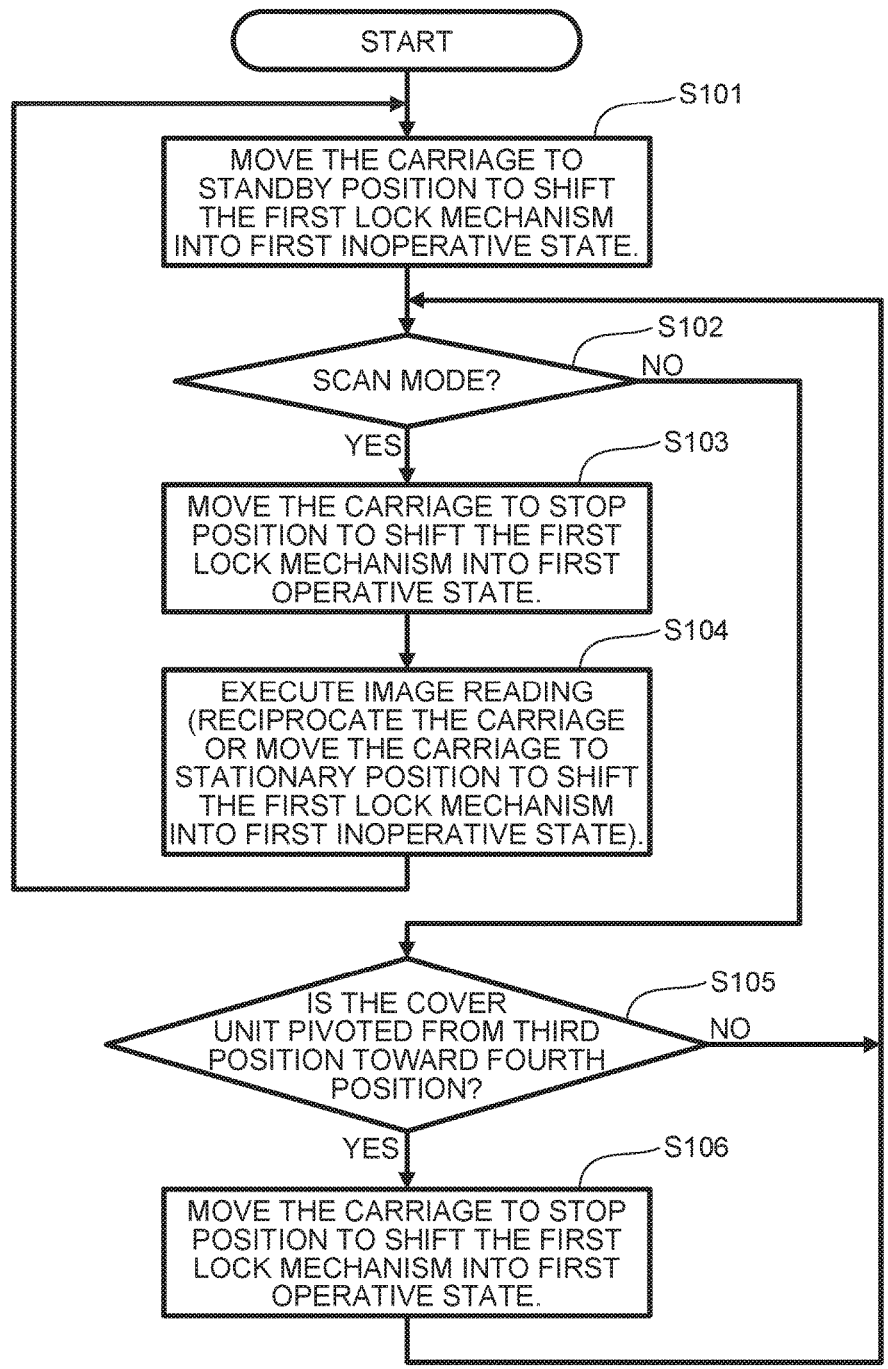
FIG. 11 is a flowchart showing a program for controlling a first lock mechanism and a first responsive mechanism in the first embodiment according to one or more aspects of the disclosure.

The controller C1 continues to execute the control program shown in FIG. 11 until the power switch of the multifunction device 1 is turned off.

<Effects>

In the multifunction device 1 in the first illustrative embodiment 1, as shown in FIGS. 5, 6, and 8 toll, the first lock mechanism 100 and the first responsive mechanism 130 are configured to effectively restrict pivoting of the scanner 8 relative to the printer 7, based on states of use of the multifunction device 1, i.e., whether the "scan mode" is selected and whether the cover unit 9 or the scanner 8 is pivoted. This may prevent or reduce unintended pivoting of the scanner 8 and eventually possible damage to the multifunction device 1.

Furthermore, as shown in FIGS. 3 and 8, the first responsive mechanism 130 is configured to shift the first lock mechanism 100 between the operative and inoperative states in response to movement of the existing carriage 30. Specifically, the first responsive mechanism 130 sifts the first lock mechanism 100 from the first inoperative state shown in FIGS. 6 and 10 to the first operative state shown in FIGS. 8 and 9, in response to the carriage 30 moving to and stopping at the particular stop position P2 shown in FIGS. 3 and 8 in the sub-scanning direction. Accordingly, the first responsive mechanism 130 and the first lock mechanism 100 may be configured simply without the need of providing a handle or the like for manually operating the first lock mechanism 100.

Accordingly, the multifunction device 1 in the first illustrative embodiment may be improved in durability without increasing the device size.

In steps S102 and S103 of FIG. 11, the controller C1 of the multifunction device 1 controls the carriage 30 to move to the particular stop position P2 in response to the selection of the "scan mode" through the operation panel 7P. This causes the first responsive mechanism 130 to shift the first lock mechanism 100 into the first operative state shown in FIGS. 8 and 9. After the selection of the "scan mode", it is expected that a user will open the cover unit 9 and place a document on the support surface 81A. The first lock mechanism 100 in the operative state restricts unintended pivoting of the scanner 8 as the cover unit 9 is opened.

In the multifunction device 1, some users may place a document on the support surface 81A before selecting the "scan mode". In this case, in steps S105 and S106 of FIG. 11, the controller C1 controls the carriage 30 to move to the particular stop position P2 when the cover unit 9 is pivoted from the third position toward the fourth position, i.e., when the cover unit 9 is opened. This causes the first responsive mechanism 130 to shift the first lock mechanism 100 into the first operative state shown in FIGS. 8 and 9. Accordingly, even when the "scan mode" is not selected, the first lock mechanism 100 restricts unintended pivoting of the scanner 8 as the cover unit 9 is opened.

In the multifunction device 1, the first responsive mechanism 130 includes the protrusion 130 which contacts and pivots the lever 110 when the carriage 30 moves in the sub-scanning direction. The engaging portion 117 of the pivoted lever 110 engages the engaged portion 107. Thus, the first responsive mechanism 130 may be structured simply.

In the multifunction device 1, the first direction in which the first axis extends and the pivot axis X110 extend substantially parallel to the sub-scanning direction which is the right-left direction. Accordingly, as shown in FIG. 5, the engaging portion 117 of the lever 110 is unlikely to be released from the engaged portion 107 even when a force F1 for pivoting the scanner 8 about the first axis X1 is applied. Furthermore, as shown in FIGS. 3 and 8, the first lock mechanism 100, which has a relatively small width in the right-left direction, may lead to downsizing of the multifunction device 1 in the right-left direction.

In the multifunction device 1, the inclined surface 135 of the protrusion 131, which contacts the contact surface 115 of the lever 110, serves as a cam for pivoting the lever 110. Thus, the inclined surface 135 pivots the lever 110 smoothly.

Furthermore, in the multifunction device 1, as shown in FIGS. 4 to 6, and 8, the first lock mechanism 100 and the first responsive mechanism 130 are disposed at an end portion of the multifunction device 1 away from the first axis X1 in the main scanning direction, i.e., at the front end portions of the scanner 8 and the printer 7. Accordingly, engagement between the engaging portion 117 of the lever 110 and the engaged portion 107 is likely to be maintained even when a force for pivoting the scanner 8 about the first axis X1 is applied.

Second Illustrative Embodiment

Figure 12:
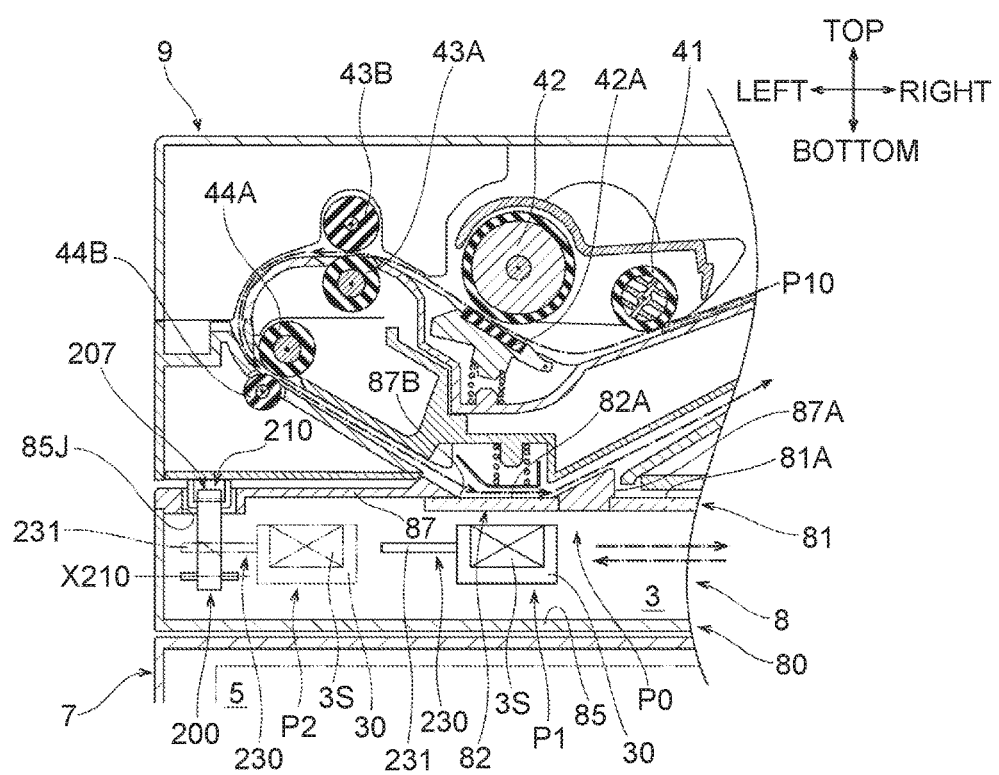
FIG. 12 is a schematic partial sectional view of a multifunction device in a second illustrative embodiment according to one or more aspects of the disclosure.
Figure 13:
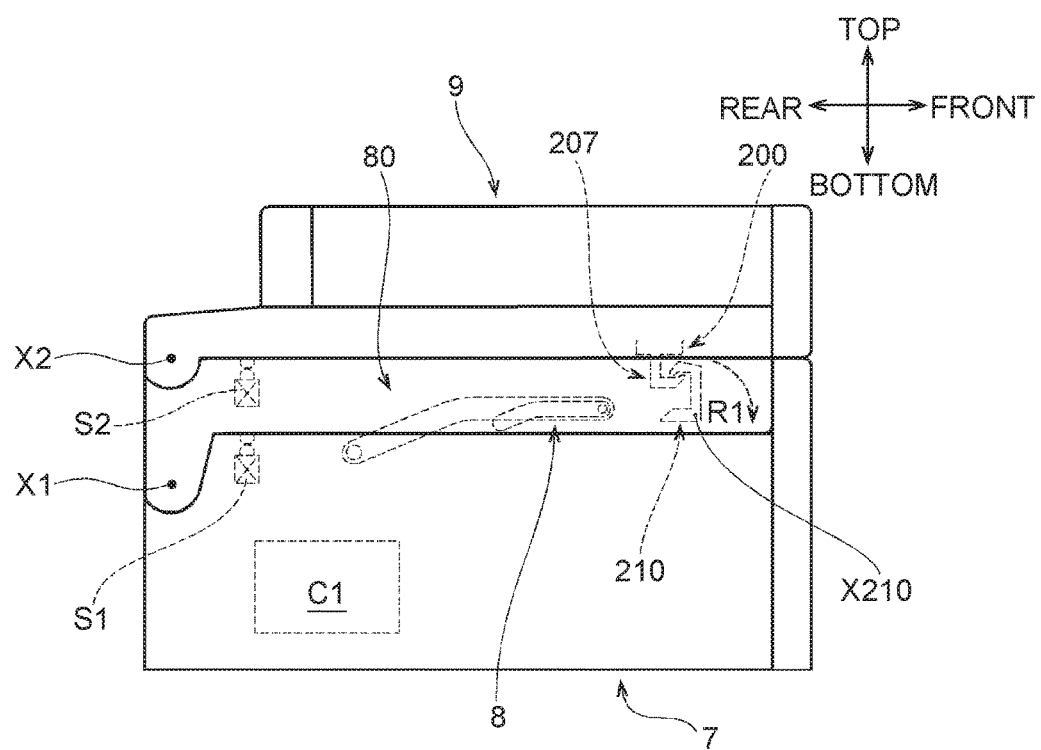
FIG. 13 is a side view of a scanner at a first position and a cover unit at a third position in the second illustrative embodiment according to one or more aspects of the disclosure.
Figure 14:
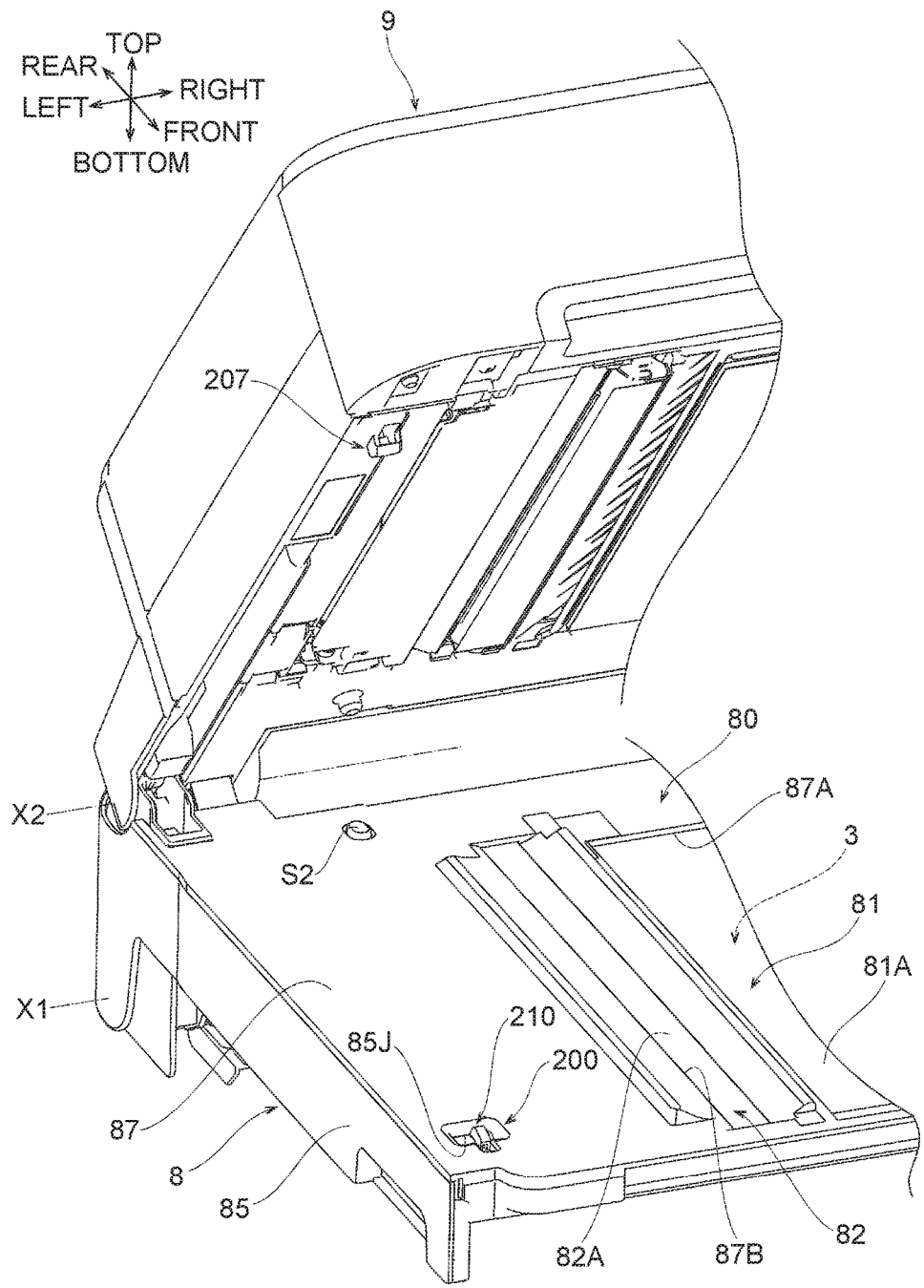
FIG. 14 is a partial perspective view of the scanner at the first position, the cover unit pivoted to a fourth position, and a second lock mechanism in the second illustrative embodiment according to one or more aspects of the disclosure.

As shown in FIGS. 12 to 14, a multifunction device according to a second illustrative embodiment includes a second lock mechanism 200 and a second responsive mechanism 230, instead of the first lock mechanism 100 and the first responsive mechanism 130 in the multifunction device 1 according to the first illustrative embodiment. A controller C1 executes a control program shown in FIG. 15 in the second illustrative embodiment, instead of the control program shown in FIG. 11 in the first illustrative embodiment. Other components in the second illustrative embodiment are configured similarly to those in the first illustrative embodiment. Thus, like reference characters are used to indicate similar elements and the associated description will be omitted or simplified.

As shown in FIGS. 12 to 14, the second lock mechanism 200 and the second responsive mechanism 230 are disposed at an end portion of a multifunction device 1 away from a first axis X1 in a main scanning direction, i.e., at front end portions of a scanner 8 and a cover unit 9. In the second illustrative embodiment, the second lock mechanism 200 and the second responsive mechanism 230 are disposed at left end portions of the scanner 8 and the cover unit 9. The second lock mechanism 200 is an example of a "lock mechanism", and the second responsive mechanism 230 is an example of a "responsive mechanism".

The second lock mechanism 200 includes an engaged portion 207 and a lever 210.

The engaged portion 207 is disposed at a front end portion of the cover unit 9 and at a position adjacent to a left side surface of the cover unit 9. The engaged portion 207, which is a substantially hook-shaped protrusion, protrudes downward from a lower surface of the cover unit 9 and is bent frontward.

The lever 210 is disposed at a front end portion of the scanner 8 and at a position adjacent to a left side surface of the scanner 8. As shown in FIG. 12, a lower end of the lever 210 is supported by lever supports (not shown) disposed inside a scanner housing 80 so as to be pivotable about a pivot axis X210 which extends in a right-left direction. As shown in FIGS. 12 and 14, a scanner frame 87 has an opening 85J. An upper end of the lever 210 is positioned in the opening 85J. As shown in FIG. 13, the upper end of the lever 210 is substantially hook-shaped and bent rearward. The lever 210 is urged by a torsion coil spring (not shown) in a direction R1 shown in FIG. 13.

As shown in FIG. 12, the second responsive mechanism 230 includes a protrusion 231 which protrudes from the carriage 30 in a direction substantially parallel to a sub-scanning direction, i.e., in a leftward direction. When the carriage 30 moves to a particular stop position P2 shown in FIG. 12, the protrusion 231 contacts a lower end of the lever 210 and causes the lever 210 to pivot about the pivot axis X210. The lever 210 pivots in a direction opposite to the direction R1 shown in FIG. 13 so as to engage the engaged portion 207. Consequently, the second lock mechanism 200 shifts into a second operative state and restricts pivoting of the cover unit 9 relative to the scanner 8.

In contrast, when the carriage 30 moves rightward away from the particular stop position P2 shown in FIG. 12, the protrusion 231 retracts away from the lower end of the lever 210, and the lever 210 is urged by the torsion coil spring (not shown) to pivot in the direction R1 shown in FIG. 13, thereby being released from the engaged portion 207. Consequently, the second lock mechanism 200 shifts into a second inoperative state shown in FIG. 14 and permits the cover unit 9 to pivot relative to the scanner 8.

The controller C1 controls the second lock mechanism 200 and the second responsive mechanism 230 using a control program shown in FIG. 15. When a power switch of the multifunction device 1 is turned on to activate the multifunction device 1, the controller C1 starts the control program shown in FIG. 15.

First, in step S201, the controller C1 controls the carriage 30 to move to a standby position P0 shown in FIG. 12. The protrusion 231 is brought out of contact with the lower end of the lever 210, and the lever 210 pivots to be released from the engaged portion 207. Consequently, the second lock mechanism 200 shifts into the second inoperative state shown in FIG. 14.

Subsequently, in step S202, the controller C1 determines, by referring to an input signal from an operation panel 7P and operating states of the multifunction device 1, whether the multifunction device 1 enters into an "image forming unit maintenance mode". If the controller C1 determines as "Yes" in the step S202, program goes to step S203. On the other hand, if the controller C1 determines as "No" in step S202, the program goes to step S205.

If the program goes from step S202 to step S203, the controller C1 controls the carriage 30 to move to the particular stop position P2 shown in FIG. 12. This causes the protrusion 231 to contact the lower end of the lever 210 such that the lever 210 pivots to engage the engaged portion 207. Consequently, the second lock mechanism 200 shifts into the second operative state shown in FIGS. 12 and 13. When the "image forming unit maintenance mode" is selected in the multifunction device 1, there is a high chance that maintenance will be performed for the image forming unit 5 in the printer 7 and that the scanner 8 will be pivoted from a first position to a second position. In contrast, there is little chance in the "image forming unit maintenance mode" that the cover unit 9 will be pivoted from a third position to a fourth position in order to place a document on a support surface 81A. In this case, the cover unit 9 may pivot unintendedly as the scanner 8 is pivoted violently. However, the second lock mechanism 200, which shifts, in step S203, into the second operative state shown in FIGS. 12 and 13, may prevent or reduce unintended pivoting of the cover unit 9. Then, the program returns to step S202.

If the program goes from step S202 to step S204, the controller C1 refers to a detection signal from a scanner open/close sensor S1 and determines whether the scanner 8 is pivoted from the first position toward the second position. If the controller C1 determines as "Yes" in step S204, the program goes to step S205. On the other hand, if the controller C1 determines as "No" in step S204, the program returns to step S202.

If the program goes from step S204 to step S205, the controller C1 controls the carriage 30 to move to the particular stop position P2 shown in FIG. 12. This causes the protrusion 131 to actuate the lever 210, and the second lock mechanism 200 shifts into the second operative state shown in FIGS. 12 and 13. If the cover unit 9 pivots as the scanner 8 is pivoted from the first position to the second position, the cover unit 9 may collide with a wall behind the multifunction device 1 and damage itself or the wall. However, the second lock mechanism 200, which shifts, in step S205, into the second operative state shown in FIGS. 12 and 13, restricts unintended pivoting of the cover unit 9. Then, the program returns to step S201.

The controller C1 continues to execute the control program shown in FIG. 15 until the power switch of the multifunction device 1 is turned off.

In the multifunction device 1 in the second illustrative embodiment 1, the second lock mechanism 200 and the second responsive mechanism 230 are configured to effectively restrict pivoting of the cover unit 9 relative to the scanner 8, based on the states of use of the multifunction device 1. This may prevent or reduce unintended pivoting of the cover unit 9 and eventually possible damage to the multifunction device 1.

Furthermore, the second responsive mechanism 230 is configured to shift the second lock mechanism 200 between the operative and inoperative states in response to movement of the existing carriage 30. Accordingly, the second lock mechanism 200 and the second responsive mechanism 230 may be structured simply without the need of providing a handle or the like for manually operating the second lock mechanism 100.

Accordingly, the multifunction device 1 in the second illustrative embodiment may be improved in durability without increasing the device size.

While the disclosure has been described in detail referring to the first and second illustrative embodiments thereof, this is merely an example, and various changes, arrangements and modifications may be applied therein without departing from the spirit and scope of the disclosure.

For example, the lock mechanism may be controlled to shift between operative and inoperative states based on an operation mode which may be input through the operation panel or may be designated by a control signal input from an external device and detected by the controller C1. The locations and shapes of the first lock mechanism 100, the second lock mechanism 200, the first responsive mechanism 130, and the second responsive mechanism 230 are not limited to those described in the first and second illustrative embodiments but may be arbitrarily selected.

A stop position at which the carriage 3 is controlled to stop is not limited to the particular stop position P2 in the first or second illustrative embodiment. For example, a stop position of the carriage 3 and a standby position of the carriage 3 may be identical to each other.

What is claimed is:

1. A multifunction device comprising:
a scanner including a support surface configured to support a document, and a scanning unit configured to scan the document supported by the support surface, the scanning unit including:
 a sensor including a plurality of reading elements arranged in a main scanning direction; and
 a moving member holding the sensor and configured to move in a sub-scanning direction which is perpendicular to the main scanning direction;
an adjacent unit disposed vertically adjacent to the scanner, the adjacent unit and the scanner being pivotable relative to each other about a first axis extending in a first direction;
a lock mechanism configured to shift between an operative state in which the lock mechanism restricts pivoting of the adjacent unit and the scanner relative to each other, and an inoperative state in which the lock mechanism permits pivoting of the adjacent unit and the scanner relative to each other, the lock mechanism including:
   an engaged portion disposed at the adjacent unit; and
   a lever protruding from the scanner toward the adjacent unit and configured to pivot, about a pivot axis, between an engaging position at which the lever engages the engaged portion, and a released position at which the lever is released from the engaged portion; and
a responsive mechanism configured to shift the lock mechanism between the operative state and the inoperative state in response to the moving member moving in the sub-scanning direction, the responsive mechanism including a protrusion protruding from the moving member in a direction substantially parallel to the sub-scanning direction,
wherein the protrusion of the responsive mechanism is configured to, in response to the moving member moving in the sub-scanning direction, contact the lever of the lock mechanism thereby causing the lever to pivot to the engaging position.

2. The multifunction device according to claim 1, wherein:
   the adjacent unit comprises a printer disposed below the scanner, the printer including an image forming unit configured to form an image on a sheet;
   the scanner is connected to the printer pivotably, about the first axis between a first position at which the scanner conceals an upper portion of the printer, and a second position at which the scanner exposes the upper portion of the printer; and
   the lock mechanism is configured to shift between the operative state in which the lock mechanism restricts pivoting of the scanner relative to the printer, and the inoperative state in which the lock mechanism permits pivoting of the scanner relative to the printer.

3. The multifunction device according to claim 2, wherein the responsive mechanism is configured to shift the lock mechanism from the inoperative state to the operative state in response to the moving member moving in the sub-scanning direction and stopping at a particular stop position.

4. The multifunction device according to claim 3, further comprising:
   a controller configured to control the moving member to move in the sub-scanning direction; and
   a detector configured to detect an instruction for activating the scanning unit,
   wherein the controller is configured to control the moving member to move to the particular stop position when the detector detects the instruction for activating the scanning unit.

5. The multifunction device according to claim 4, further comprising a cover unit disposed above the scanner and connected to the scanner pivotably, about a second axis extending in the first direction, between a third position at which the cover unit conceals the support surface of the scanner, and a fourth position at which the cover unit exposes the support surface of the scanner,
   wherein the detector is configured to detect pivoting of the cover unit from the third position toward the fourth position, and
   wherein the controller is configured to control the moving member to move to the particular stop position when the detector detects pivoting of the cover unit from the third position toward the fourth position.

6. The multifunction device according to claim 1, wherein the first direction and the pivot axis of the lever extend in the direction substantially parallel to the sub-scanning direction.

7. The multifunction device according to claim 1,
   wherein the lever of the lock mechanism includes a contact surface radially away from the pivot axis of the lever, and
   wherein a tip of the protrusion of the responsive mechanism includes an inclined surface which is inclined to intersect the pivot axis of the lever, the inclined surface being configured to contact the contact surface of the lever thereby causing the lever to pivot about the pivot axis.

8. The multifunction device according to claim 1, wherein the lock mechanism and the responsive mechanism are disposed at an end portion of the multifunction device, the end portion being away from the first axis in the main scanning direction.

9. The multifunction device according to claim 1, further comprising:
   a printer disposed below the scanner, the printer including an image forming unit configured to form an image on a sheet, wherein:
   the scanner is connected to the printer pivotably, about a second axis extending in the first direction, between a first position at which the scanner conceals an upper portion of the printer, and a second position at which the scanner exposes the upper portion of the printer;
   the adjacent unit comprises a cover unit disposed above the scanner and connected to the scanner pivotably, about the first axis between a third position at which the cover unit conceals the support surface of the scanner, and a fourth position at which the cover unit exposes the support surface of the scanner; and
   the lock mechanism is configured to shift between the operative state in which the lock mechanism restricts pivoting of the cover unit relative to the scanner, and the inoperative state in which the lock mechanism permits pivoting of the cover unit relative to the scanner.

10. The multifunction device according to claim 9,
    wherein the cover unit includes a conveyor unit accommodated therein and configured to convey a document sheet, and
    wherein the scanning unit of the scanner is configured to read the document sheet conveyed by the conveyor unit.

11. The multifunction device according to claim 9, wherein the responsive mechanism is configured to shift the lock mechanism from the inoperative state to the operative state in response to the moving member moving in the sub-scanning direction and stopping at a particular stop position.

12. The multifunction device according to claim 11, further comprising:
    a controller configured to control the moving member to move in the sub-scanning direction; and
    a detector configured to detect pivoting of the scanner from the first position toward the second position,
    wherein the controller is configured to control the moving member to move to the particular stop position when the detector detects pivoting of the scanner from the first position toward the second position.

13. A multifunction device comprising:

a scanner including a support surface configured to support a document, and a scanning unit configured to scan the document supported by the support surface, the scanning unit including:
- a sensor including a plurality of reading elements arranged in a main scanning direction; and
- a moving member holding the sensor and configured to move in a sub-scanning direction which is perpendicular to the main scanning direction;

an adjacent unit disposed vertically adjacent to the scanner, the adjacent unit and the scanner being pivotable relative to each other about a first axis extending in a first direction;

a lock mechanism configured to shift between an operative state in which the lock mechanism restricts pivoting of the adjacent unit and the scanner relative to each other, and an inoperative state in which the lock mechanism permits pivoting of the adjacent unit and the scanner relative to each other; and a responsive mechanism configured to shift the lock mechanism between the operative state and the inoperative state in response to movement of the moving member in the sub-scanning direction, wherein the moving member is movable between a standby position and a stop position in the sub-scanning direction, and wherein movement of the moving member from the standby position to the stop position causes the responsive mechanism to mechanically interact with the lock mechanism shifting the lock mechanism from the inoperative state to the operative state, and movement of the moving member from the stop position to the standby position causes the responsive mechanism to mechanically interact with the lock mechanism shifting the lock mechanism from the operative state to the inoperative state.

* * * * *

UNITED STATES PATENT AND TRADEMARK OFFICE
CERTIFICATE OF CORRECTION

PATENT NO. : 10,230,859 B2
APPLICATION NO. : 15/336873
DATED : March 12, 2019
INVENTOR(S) : Katsuro Miura Page 1 of 1

It is certified that error appears in the above-identified patent and that said Letters Patent is hereby corrected as shown below:

On the Title Page

Under Abstract, Item (57), Line 10:
Please delete "exposes the upper." and insert --exposes the upper portion.--

Signed and Sealed this
Twenty-fifth Day of June, 2019

Andrei Iancu
*Director of the United States Patent and Trademark Office*